J. H. LUETHJE.
EARTH EXCAVATING MACHINE.
APPLICATION FILED MAR. 30, 1909.

988,883.

Patented Apr. 4, 1911.
9 SHEETS—SHEET 1.

J. H. LUETHJE.
EARTH EXCAVATING MACHINE.
APPLICATION FILED MAR. 30, 1909.

988,883.

Patented Apr. 4, 1911.
9 SHEETS—SHEET 2.

J. H. LUETHJE.
EARTH EXCAVATING MACHINE.
APPLICATION FILED MAR. 30, 1909.

988,883.

Patented Apr. 4, 1911.
9 SHEETS—SHEET 6.

J. H. LUETHJE.
EARTH EXCAVATING MACHINE.
APPLICATION FILED MAR. 30, 1909.

988,883.

Patented Apr. 4, 1911.
9 SHEETS—SHEET 7.

UNITED STATES PATENT OFFICE.

JOHN H. LUETHJE, OF DES MOINES, IOWA.

EARTH-EXCAVATING MACHINE.

988,883.

Specification of Letters Patent.

Patented Apr. 4, 1911.

Application filed March 30, 1909. Serial No. 487,342.

*To all whom it may concern:*

Be it known that I, JOHN H. LUETHJE, a citizen of the United States of America, and resident of Des Moines, Polk county, Iowa, have invented a new and useful Earth-Excavating Machine, of which the following is a specification.

The object of this invention is to provide improved means for cutting, elevating and loading earth.

A further object of this invention is to provide improved means for adjusting the depth of a cut made by the machine.

A further object of this invention is to provide improved means for conveying elevated earth to a vehicle by which it may be transported.

A further object of this invention is to provide improved means for cutting slices of earth from a bank.

A further object of this invention is to provide means for excavating one portion of a given width of cut or trench at one advance of the machine and then reversing the machine and excavating the remaining portion of the cut or trench in a return travel of the machine.

My invention consists in the construction, arrangement and combination of elements hereinafter set forth, pointed out in my claims and illustrated by the accompanying drawing, in which—

In the construction of the machine as shown the numeral 10 designates an axle shaft supported at its ends and journaled in wheels 11, 12. Supporting arms 13 are journaled to and supported on and rise from the shaft 10 and side bars 14, 15 are arranged in pairs and are pivoted at their rear ends at different altitudes to and extend forward horizontally from said arms.

Figure 3:
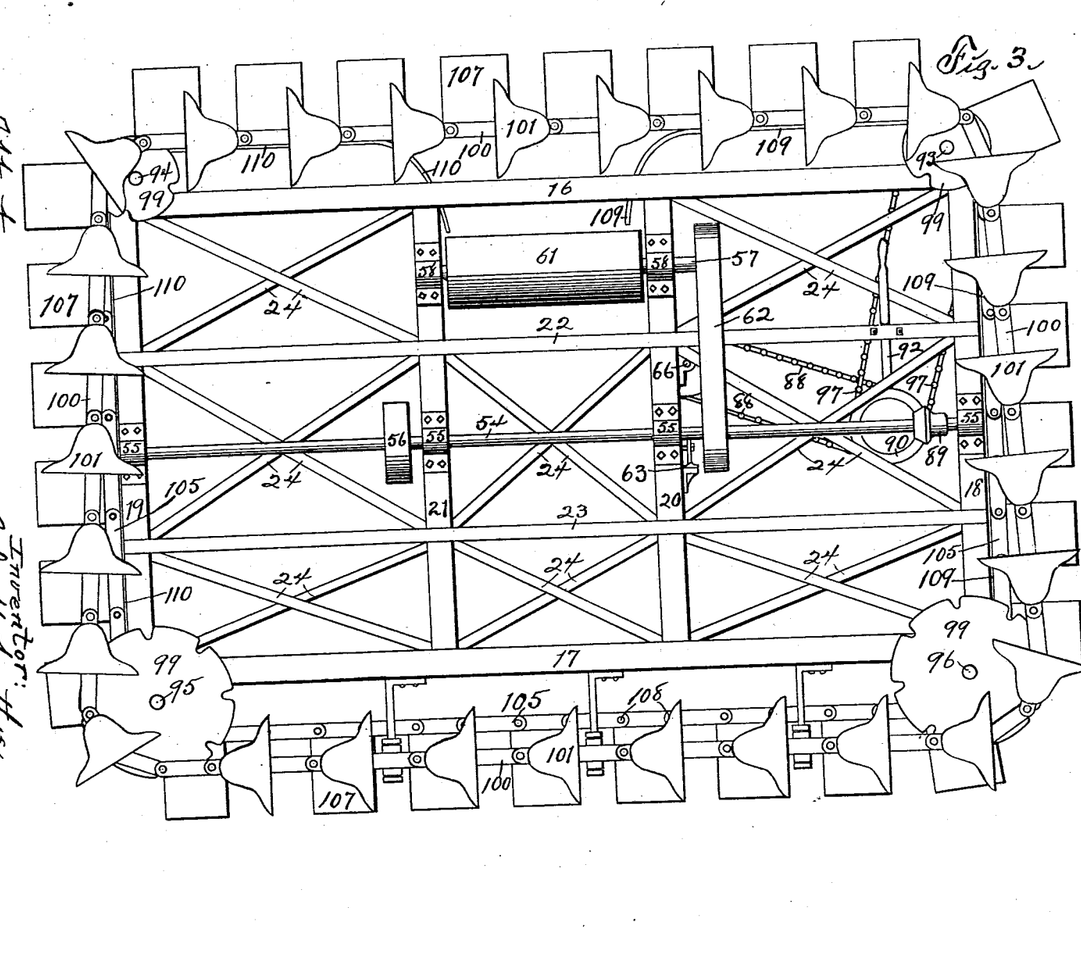
Fig. 3 is a front elevation of the machine, the tongue or pole being removed.
Figure 4:
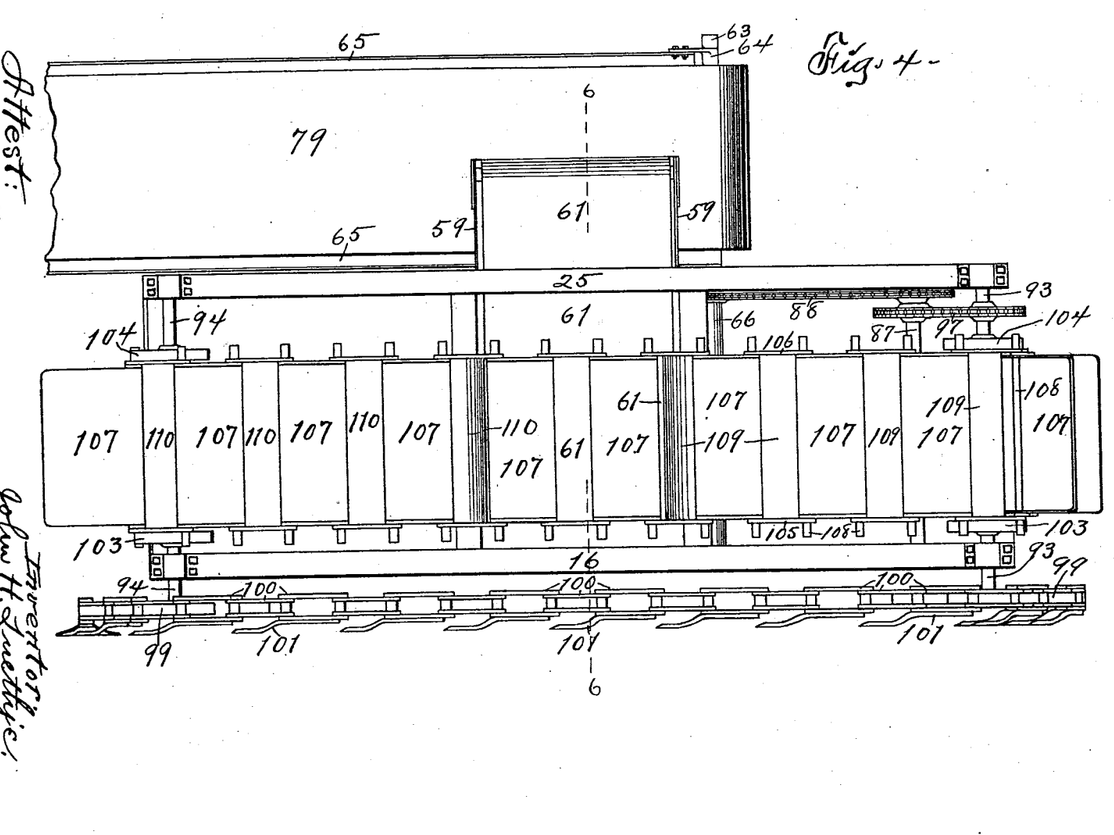
Fig. 4 is a plan of the machine.

A front frame is provided and is constructed of horizontal beams 16, 17, end posts 18, 19, interior posts 20, 21, horizontal bars 22, 23 and oblique braces 24, all rigidly connected. (See Fig. 3.)

Figure 5:
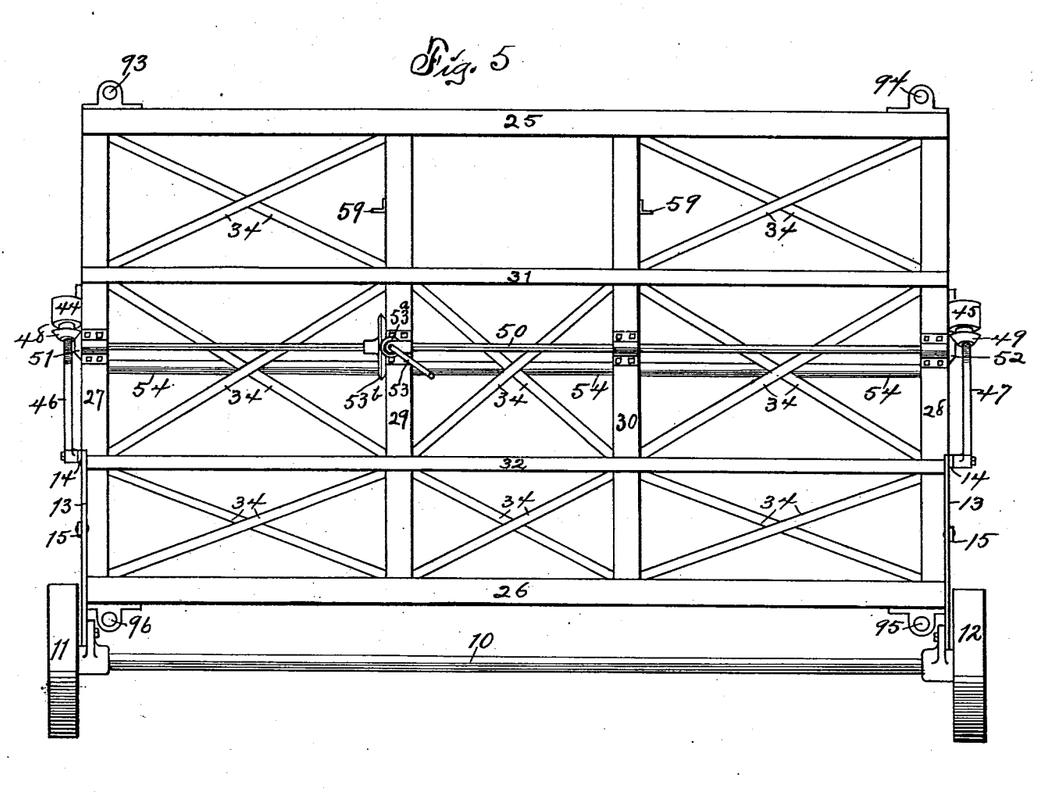
Fig. 5 is a rear elevation of a part of the machine.
Figure 6:
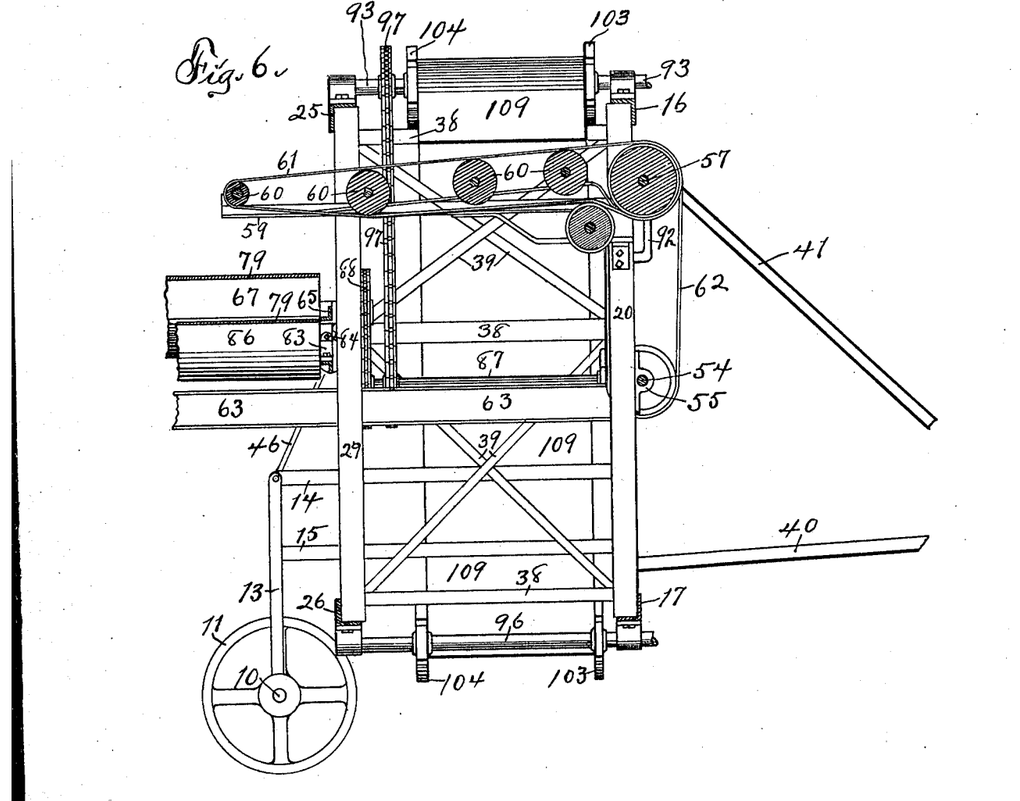
Fig. 6 is a vertical section of the machine on the indicated line 6—6 of Fig. 4.
Figures 7, 12:
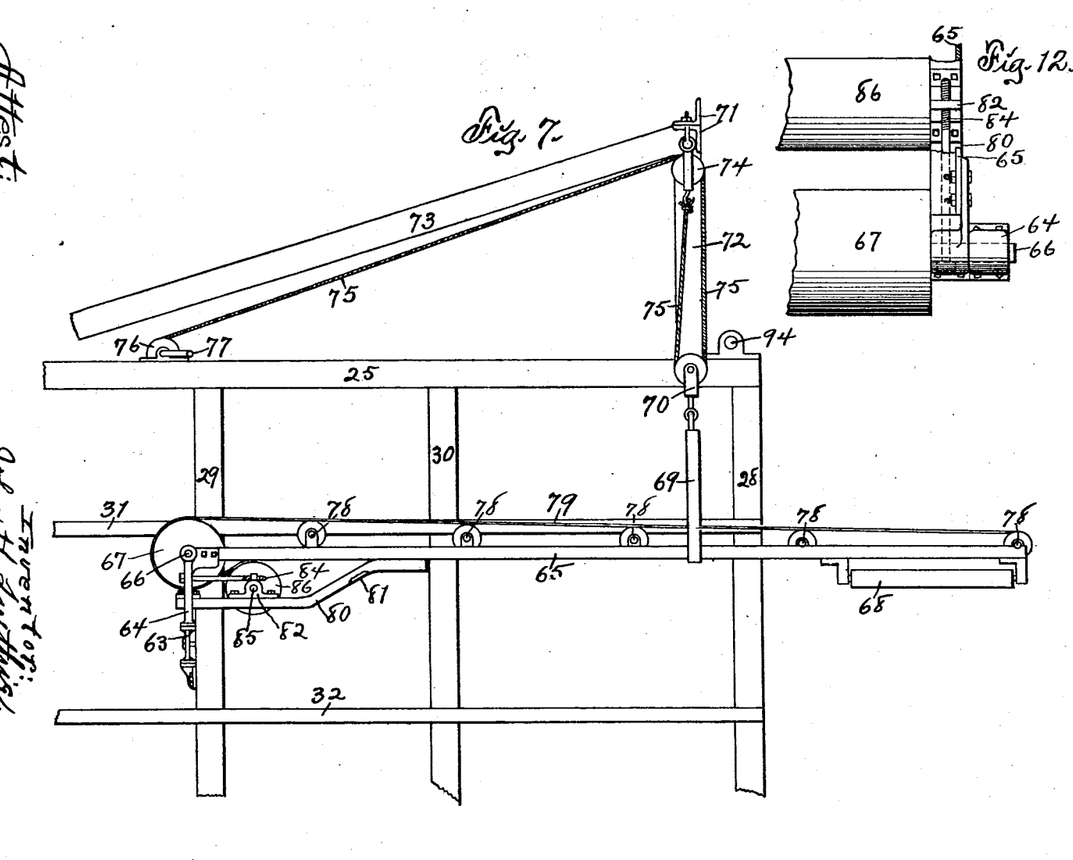
Fig. 7 is a detail rear elevation of parts of the machine, illustrating means employed to raise and lower a conveyer.
Fig. 12 is a detail plan of parts of the lateral conveyer.
Figure 8:
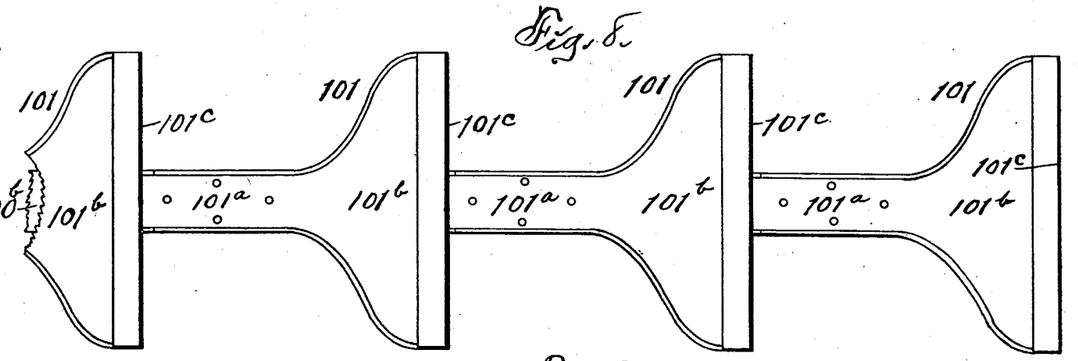
Figs. 8 and 9 are a front view and plan respectively of the cutting devices and the means for supporting and driving the same.

A rear frame is provided, (Fig. 5) and is constructed of horizontal beams 25, 26, end posts 27, 28, interior posts 29, 30, horizontal bars 31, 32, and oblique braces 34, all rigidly connected.

The forward end portions of the side bars 14, 15 are pivoted to the end posts 18, 19 of the front frame and the body portions of said side bars are slidingly confined by keepers 36, 37 mounted vertically on the end posts 27, 28 of the rear frame. The posts of the front frame are joined rigidly to the posts of the rear frame by horizontal bars 38 and oblique braces 39.

A tongue frame 40 is fixed to the lower end portions of the end posts 18, 19 of the front frame and is adjustably connected to the upper ends of said front posts by braces 41, 42 adjustable as to length in any common manner, such as by turnbuckles 43.

Bearings 44, 45 are swiveled on and extend laterally from the central portions of the end posts 27, 28 of the rear frame and rods 46, 47 are pivoted at their rear (lower) ends to the upper corners of the axle arms 13 and extend obliquely through said bearings. The upper (forward) ends of the rods 46, 47 are threaded and gear nuts 48, 49 are screwed thereon beneath and in engagement with the bearings 44, 45.

A shaft 50 is journaled in bearings on and extends horizontally across the rear frame of the machine, and gears 51, 52 on said shaft mesh with the gear nuts 48, 49. The shaft 50 may be rotated at times in any desired manner, such as by a crank shaft 53 carrying a bevel gear 53ª meshing with a bevel gear 53ᵇ thereon, in order that the gear nuts, 48, 49 be rotated and the threaded rods 46, 47 be raised or lowered as required to raise or lower the rear frame of the machine relative to the axle 10.

The tongue frame 40 may be connected at its forward end by a clevis 40ª to a traction engine (not shown) whereby any vertical adjustment of the frame relative to the axle articulates on such connection and effects a raising or lowering of all the mechanism carried by the frame.

A power shaft 54 is journaled in bearings 55 carried by the posts of the front frame and extends horizontally across said frame. The power shaft 54 is provided with a pulley 56 adapted to be driven by gearing from the traction engine (not shown).

A drum shaft 57 is journaled in bearings 58 on the interior posts 20, 21 of the front frame and is arranged above and parallel with the power shaft 54.

A conveyer frame 59 is mounted between and fixed to the posts 20, 21 and 29, 30 and extends rearward from the rear frame of the machine. Idler shafts 60, in any desired number, are journaled in bearings on the conveyer frame 59 and said idler shafts and the drum shaft 57 carry a belt conveyer 61. The drum shaft 57 is geared to the power shaft 54 preferably by sprocket gearing 62. The rear end portion or delivery end of the conveyer 61 is materially to the rear of the rear frame of the machine.

A beam 63 is fixed to and extends horizontally rearward from the interior posts 20 and 29 and a standard 64 is fixed to and rises from the beam at the rear of the rear frame of the machine. A shaft 66 is journaled in bearings in the upper end of the standard 64, and on the post 29 and a drum 67 is fixed to said shaft between said standard and post. A conveyer frame 65 is journaled at its rear end on the shaft 66 and extends approximately horizontally across the rear frame of the machine. A roller 68 is journaled to and beneath the outer end of the conveyer frame 65 and is adapted to ride at times on the side of the box of a vehicle (not shown). A yoke or stirrup 69 is fixed to and rises from the intermediate portion of the conveyer frame 65 and a pulley block 70 is attached to the upper end thereof.

A beam 71 is fixed to and extends rearwardly from the front and rear frames of the machine and is supported on the upper ends of standards 72 carried by said frames and is further connected to the frames by braces 73. A pulley block 74 is suspended from the rear end of the beam 71. A cable 75 is fixed at one end to the block 74, is rove through the pulley of the block 70, is rove through the pulley of the block 74 and the opposite end of said cable is fixed to and adapted to be wound on a shaft or drum 76 journaled on the beam 25. The drum shaft may be rotated manually by a crank 77.

Idler shafts 78 are mounted on the conveyer frame 65 in any desired number and, together with the drum 67, carry a conveyer 79. The delivery end of the conveyer 79 projects laterally beyond the frames of the machine. Brackets 80, 81 are fixed to and beneath the inner end of the conveyer frame 65 and bearings 82, 83 are slidingly mounted thereon and are adjusted to and from the standard 64 and post 29 by screws 84. A shaft 85 is journaled in the bearings 82, 83 and a tightener drum 86 is mounted on said shaft and engages the returning portion of the conveyer 79, whereby said conveyer may be tightened on its drums. In the means for raising and lowering the conveyer frame 65 and devices thereon, provision is made for adjusting the delivery end of the conveyer 79 in respect of the altitude of the vehicle in which delivery is made.

Figure 9:
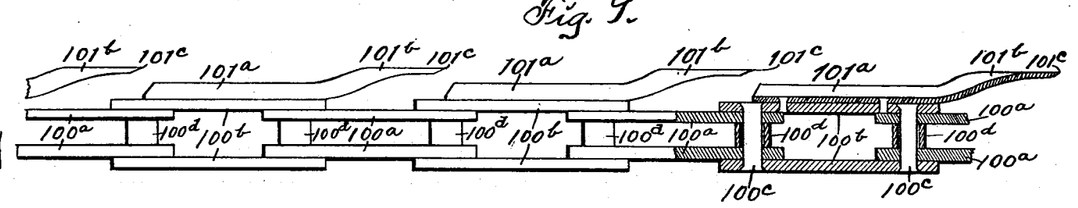
Figure 10:
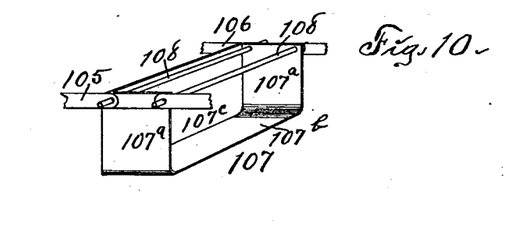
Fig. 10 is a perspective of one of the elevator buckets and rods and links supporting the same.
Figure 11:
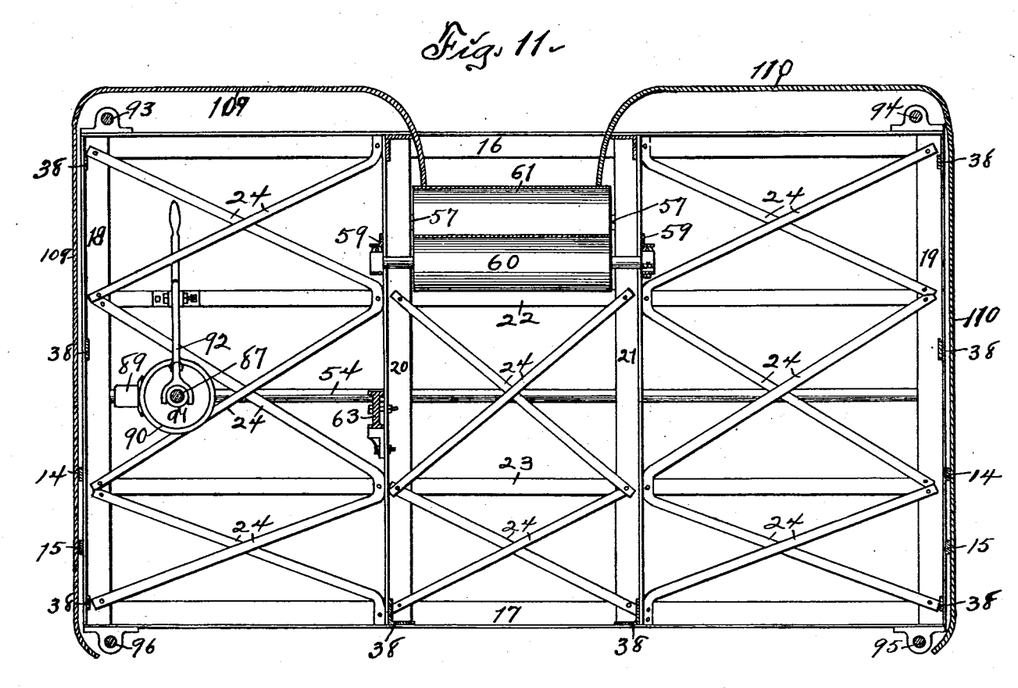
Fig. 11 is a cross-section of parts of the machine looking toward the front.

A countershaft 87 is arranged at right angles to the power shaft 54 and is journaled in bearings on the front and rear frames of the machine. A sprocket gearing 88 connects the countershaft 87 to the inner end portion of the drum shaft 66. A bevel gear 89 on the power shaft 54 meshes with a bevel gear 90 loosely mounted on the countershaft 87, and the latter gear is adapted to be engaged by a clutch member 91 feathered to the countershaft and arranged for manual adjustment by a lever 92. Shafts 93, 94, 95 and 96 are journaled in bearings carried by corners of the front and rear frames of the machine and said shafts are parallel with each other and with the countershaft 87. Sprocket gearing 97 connects the countershaft 87 to the shaft 93. There is a clutch connection 98 adapted to be operated by a lever 98$^a$ between the countershaft 87 and the sprocket gearing 97 in order that the conveyer 79 may be continued in operation to be unloaded after the cutting and elevating mechanism is stopped. Sprocket wheels 99 are mounted rigidly on the forward ends of the shafts 93, 94, 95 and 96 and a chain 100 is mounted on and driven by said wheels. Cutters 101 are mounted on the chain 100 and the cutting edges thereof are perpendicular to the surface of the ground over which the machine travels. The chain 100 is constructed of links 100$^a$ (Fig. 9) parallel with each other and spaced apart; links 100$^b$ parallel with each other and spaced apart, end portions of the links 100$^b$ overlying and inclosing end portions of the links 100$^a$; pivotal pins 100$^c$ extending through the overlapping ends of the links, journaled as to the links 100$^a$ and riveted as to the links 100$^b$; and bushings 100$^d$ on said pins between the links 100$^a$. The cutters 101 are constructed of sheet metal, such as steel, and are formed each with stem 101$^a$ adapted to be bolted to the outermost link 100$^b$; a broad blade 101$^b$ offset outwardly from the stem and having its greatest transverse dimension at right angles to the stem and to the link 100$^b$; and a cutting edge 101$^c$ on the forward margin of the blade 101$^b$.

Figure 1:
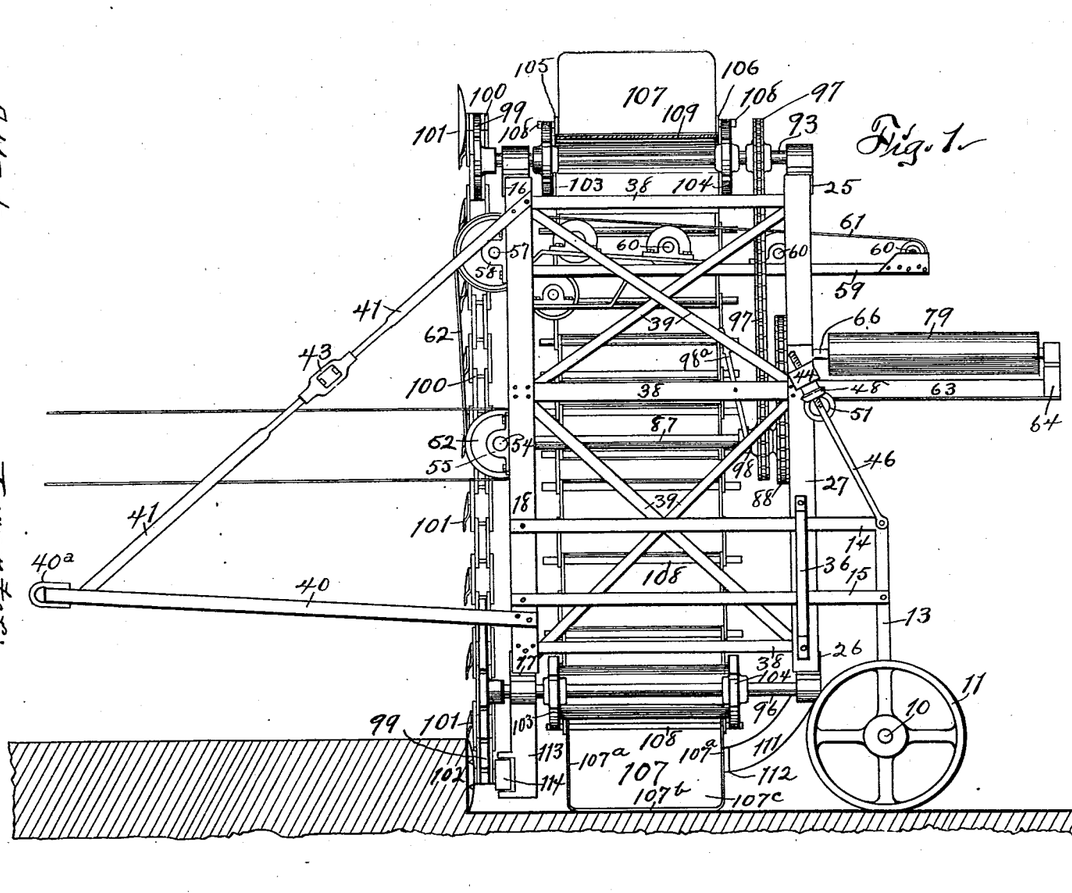
Figure 1 is a side elevation of the machine, partly in section.
Figure 2:
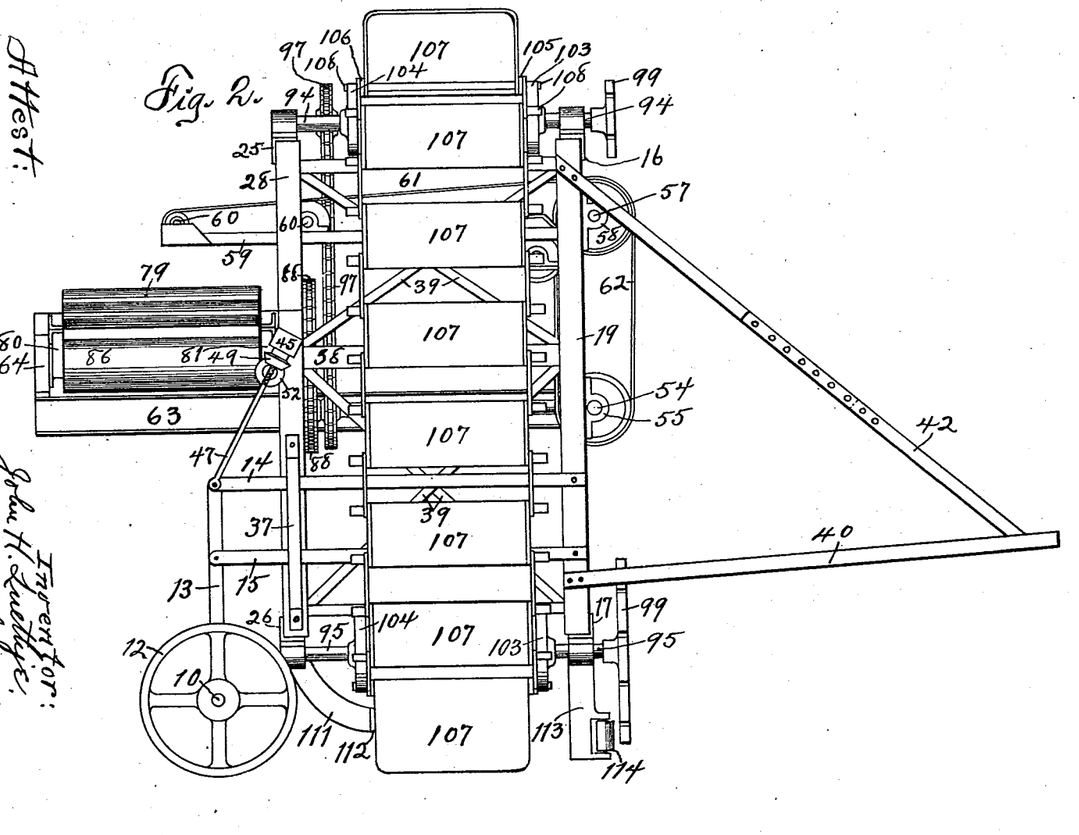
Fig. 2 is an opposite side elevation of the machine.

In the rotation of the shafts 93, 94, 95 and 96 the wheels 99 are revolved and carry the chain 100 and cutters 101 in such manner that the cutters travel across the path of travel of the machine and cut slices from a perpendicular bank of earth 102 (Fig. 1). The length of the bank 102 of earth is approximately the width of the machine frame, and the height of such bank is approximately the vertical width of the cutters and equal to the length of the cutting edges 101$^c$. The thickness of the slice cut from the bank 102 is approximately the same as the degree of offset of the blade 101$^b$ relative to the stem 101$^a$. The gearing is apportioned in such manner that the machine advances at the proper speed relative to the cutters. Suitable backing means 113, 114, may be provided to engage the chain 100 and hold the cutters 101 toward the bank 102.

Sprocket wheels 103, 104 are mounted rigidly in pairs on the shafts 93, 94, 95 and 96 between the front and rear frames of the machine. Chains 105, 106 are mounted on and driven by the wheels 103, 104 and buckets 107 are fixed to and arranged between said chains. Each bucket 107 is constructed of sheet metal and comprises ends 107$^a$, a bottom 107$^b$ and a rear wall 107$^c$. The front and top of the bucket are open. Rods 108 are mounted through the ends 107$^a$ and extend across the bucket parallel with the bottom and rear wall and end portions of said rods engage the sprocket wheels 103, 104 for the purpose of supporting and driving the chains. The rods 108 also extend through the links of the chains 105, 106 and provide pivotal connections between said links. A sheet metal plate 109 is fixed to the end and top of the machine frame and extends from a point where the buckets 107 begin ascent to a point adjacent the initial margin of the conveyer 61. This plate 109 serves to retain earth in the buckets during ascending travel and during horizontal travel along the top of the machine frame to the conveyer 61 and permit deposit of the contents of such buckets upon said conveyer only. A sheet metal plate 110 is arranged beneath the buckets 107 on the top of the machine frame and extends from the opposite margin of the conveyer 61 from the plate 109 to the point of descent of the buckets, and prevents accidental deposit of adhering earth in the machinery beyond the conveyer. The conveyer 61 receives the earth from the buckets and delivers the same to the conveyer 79, which in turn delivers said earth to a vehicle (not shown). Brace arms 111 extend downward and inward from the beam 26 of the rear frame and a bar 112 is fixed to the lower ends of said arms and extends horizontally at the rear of the buckets. It is the function of the bar 112 to engage the buckets during horizontal travel thereof beneath the machine frame and hold the same forwardly toward the cutters, in order that said buckets may travel transversely of the path of advance and collect the cut earth.

The machine may be advanced any given and desired distance and cut and excavate to the full width of the machine. Then if it is desired to make an excavation of greater width than the machine, said machine may be reversed or turned around and caused to return on a parallel path and excavate its full width or to any degree less than its full width during its return travel, thus providing means for excavating one portion of a given width of cut or trench at one advance of the machine and then reversing the machine and excavating the remaining portion of the cut or trench during return travel.

I claim as my invention—

1. An earth excavating machine, comprising a wheeled frame, means for advancing said frame, means for adjusting the altitude of the frame, cutting mechanism arranged for travel in an angular orbit on the front of said frame, said cutting mechanism arranged for travel transversely of the path of advance of said frame and having the cutting blades thereof arranged vertically during the operation of cutting, elevating mechanism at the rear of the cutting mechanism, and conveying mechanism leading from the elevating mechanism.

2. An earth excavating machine, comprising a wheeled frame, means for advancing said frame, means for adjusting the altitude of said frame, cutting mechanism arranged for travel in an angular orbit on the front of the frame, said cutting mechanism arranged for travel transversely of the path of advance of said frame and having the cutting blades thereof arranged vertically during the operation of cutting, elevating mechanism at the rear of the cutting mechanism and independent thereof, conveying mechanism leading from the elevating mechanism, and driving mechanism common to the cutting, elevating and conveying mechanisms.

3. An earth excavating machine, comprising a wheeled frame, means for connecting said frame to draft devices, means for adjusting the altitude of said frame, cutting mechanism arranged for travel in an angular orbit on the front of the frame and arranged for travel transversely of the path of advance of the machine, said cutting mechanism being located wholly in front of the machine frame and composed of pivotally connected links and cutters carried by alternate links, said cutters formed with edges arranged vertically during the operation of cutting, elevating mechanism at the rear of the cutting mechanism and adapted to travel in an orbit parallel thereto, conveying mechanism leading from the elevating mechanism, and means for driving said mechanisms.

4. An earth excavating machine, comprising a wheeled frame, means for advancing said frame, means for adjusting the altitude of said frame, cutting mechanism on the front of the frame and arranged for travel in an angular orbit, upper and lower portions of said cutting mechanism arranged to travel oppositely transversely of the path of advance of the machine, said cutting mechanism being located wholly in front of the machine frame and composed of pivotally connected links and cutters carried by alternate links, said cutters formed with edges arranged vertically during the operation of cutting, elevating mechanism on the frame at the rear of the cutting mechanism and arranged to travel in an orbit parallel thereto and in the same direction as the cutting mechanism, conveying mechanism leading from the elevating mechanism, and means for driving said mechanisms.

5. An earth excavating mechanism, comprising a frame, means for advancing said frame, cutting mechanism arranged for travel in an angular orbit, upper and lower portions of said cutting mechanism arranged to travel oppositely transversely of the path of advance of the frame, said cutting mechanism being located wholly in front of the machine frame and composed of pivotally connected links and cutters carried by alternate links, said cutters formed with edges arranged vertically during the operation of cutting, elevating mechanism on the frame arranged for travel in an angular orbit parallel with and to the rear of the orbit of the cutting mechanism, a conveyer at right angles to the elevating mechanism and a conveyer at right angles to the first conveyer, together with means for driving said mechanisms and conveyers.

6. An earth excavating mechanism, comprising a frame, means for advancing said frame, cutting mechanism on said frame and arranged for travel in an angular orbit, upper and lower portions of said cutting mechanism arranged to travel oppositely transversely of the path of advance of the frame, backing means engaging said cutting mechanism, said backing means comprising a roller bed at the rear of the lower transversely traveling portion of the cutting mechanism, elevating mechanism on said frame at the rear of the backing means for the cutting mechanism and arranged for travel in an angular orbit parallel with and spaced from the cutting mechanism, backing means comprising arms on the frame and a bar carried by said arms in a horizontal plane at the rear of and arranged for engaging the lower transversely traveling portion of the elevating mechanism, and conveyers leading from said elevating mechanism.

7. An earth excavating machine, comprising a frame, means for advancing the frame, cutting mechanism on said frame, elevating mechanism on said frame arranged for travel in a rectangular orbit, plates on the ends and top of said frame adapted for sliding engagement with the elevating mechanism, and conveying mechanism leading from said elevating mechanism, said plates spaced apart by and communicating with said conveying mechanism.

8. An earth excavating machine, comprising a frame, means for advancing said frame, cutting mechanism on said frame arranged for travel in an angular orbit, upper and lower portions of said cutting mechanism arranged to travel oppositely transversely of the path of advance of the frame, said cutting mechanism being located wholly in front of said frame and supported at four points for travel through an angular orbit and also provided with cutters having their edges arranged vertically during the operation of cutting, elevating mechanism on the frame parallel with and spaced from the cutting mechanism, a conveyer at right angles to the elevating mechanism, a delivery conveyer at right angles to the first conveyer, means for oscillating the delivery conveyer, and means for driving said mechanisms and conveyers.

9. An earth excavating machine, comprising a frame, means for advancing said frame, cutting mechanism on said frame arranged for travel in an angular orbit, upper and lower portions of said cutting mechanism arranged to travel oppositely transversely of the path of advance of the frame, elevating mechanism on the frame parallel with and spaced from the cutting mechanism, backing means between the cutting and elevating mechanisms and adapted to be engaged by said cutting mechanism, backing means on the frame at the rear of and adapted to be engaged by the lower transversely traveling portion of the elevating mechanism, a conveyer at right angles to the elevating mechanism and adapted to receive earth therefrom, a delivery conveyer at right angles to the first conveyer, means for oscillating the delivery conveyer, and a roller on the delivery conveyer adapted for contact with a vehicle.

10. An earth excavating machine, comprising a frame, means for advancing said frame, shafts mounted in said frame parallel with the line of advance of the frame, endless cutting mechanism mounted on said shafts in front of said frame, endless bucket-elevating mechanism on said shafts within said frame, a conveyer in said frame and arranged for travel at right angles to said elevating mechanism, said conveyer within the orbit of the elevating mechanism and arranged to receive earth therefrom, an adjustable delivery conveyer arranged at right angles to the first conveyer and in position to receive earth therefrom, and driving mechanism common to the mechanisms and conveyers.

11. An earth excavating machine, comprising a frame, an endless cutting mechanism arranged for orbital travel on said frame, arms on said frame, rollers on said arms at right angles to the path of travel of and arranged to engage the endless cutting mechanism, and elevating and conveying mechanisms on said frame.

12. An earth excavating machine, comprising a frame, cutting mechanism on said frame, endless elevating mechanism on said frame, arms on said frame, a bar on said arms arranged for sliding engagement with the elevating mechanism, and conveying mechanisms on said frame.

13. In an earth excavating machine, a cutting mechanism comprising pivotally connected links and cutters mounted on alternate links throughout the length of the chain, each cutter comprising a stem longitudinally of and fixed to a link and a blade offset into a plane parallel with the stem and formed with a cutting edge transversely of and of greater width than said link.

14. In an earth excavating machine, a chain and cutters mounted thereon, said cutters each comprising a stem longitudinally of the chain and fixed thereto, a blade integral with an offset relative to said stem, said blade of greater width than the stem and crossing the plane of the chain, said blade formed with a cutting edge arranged perpendicular to the trend of the chain.

15. In an excavating machine, supporting wheels, an axle therein, arms journaled to and rising from said axle, pairs of bars journaled at their rear ends to said arms, a frame between said pairs of bars, the forward ends of said bars pivoted to the forward portion of the frame, adjusting mechanism connecting the rear portion of the frame to the upper ends of said arms, a tongue on said frame, and cutting, elevating and conveying mechanisms on said frame.

16. In an excavating machine, a rectangular upright frame, four shafts mounted for rotation and extending transversely of corner portions of said frame, endless conveying mechanism mounted on said shafts between the front and rear vertical planes of said frame, and endless cutting mechanism mounted on said four shafts in front of the front plane of said frame, whereby said endless cutting mechanism is adapted for travel through an angular orbit, the cutters of said mechanism having edges arranged vertically during the operation of cutting.

Signed by me at Des Moines, Iowa, this 13th day of May, 1908.

JOHN H. LUETHJE.

Witnesses:
S. C. SWEET,
W. W. FINK.

---

Copies of this patent may be obtained for five cents each, by addressing the "Commissioner of Patents, Washington, D. C."